United States Patent [19]

Fintel

[11] Patent Number: 5,704,312

[45] Date of Patent: Jan. 6, 1998

[54] WOODPECKER FEEDER

[76] Inventor: William Achard Fintel, 6 Point Cir., Lewes, Del. 19958

[21] Appl. No.: 405,754

[22] Filed: Mar. 20, 1995

[51] Int. Cl.⁶ ............................................. A01K 39/00
[52] U.S. Cl. ........................................................ 119/57.9
[58] Field of Search ............................... 119/57.8, 57.9, 119/52.1, 52.2, 52.3, 52.4, 51.03, 51.01

[56] References Cited

U.S. PATENT DOCUMENTS

| | | | |
|---|---|---|---|
| 590,458 | 9/1897 | Lee | 119/51.03 |
| 3,140,692 | 7/1964 | Beyea | 119/51.03 |
| 3,186,379 | 6/1965 | Grella | 119/51.01 |
| 3,399,650 | 9/1968 | Goodman . | |
| 3,482,549 | 12/1969 | Episcopo | 119/52.3 |
| 3,848,570 | 11/1974 | Scigliano | 119/51.03 |
| 3,927,645 | 12/1975 | Varner | 119/63 |
| 3,948,220 | 4/1976 | Fiedler | 119/52.3 |
| 4,437,432 | 3/1984 | Immeyer et al. | 119/18 |
| 5,052,342 | 10/1991 | Scneider | 119/57.8 X |
| 5,076,214 | 12/1991 | Petit | 119/51.03 |
| 5,111,772 | 5/1992 | Lipton | 119/57.9 |
| 5,235,934 | 8/1993 | Runion | 119/51.01 |

FOREIGN PATENT DOCUMENTS 538040  10/1931  Germany .................. 119/57.8

OTHER PUBLICATIONS

The Wild Bird Store Catalog, Everything for the wild bird enthusiast, 1994–95.

*Primary Examiner*—Thomas Price
*Attorney, Agent, or Firm*—John C. Andrade, Esq.

[57] ABSTRACT

Embodiments of a new woodpecker feeder are disclosed, each effectively preventing undesirable pest birds and squirrels from feeding yet allowing woodpeckers to feed by providing slotted access to the feed that is 6–12 mm. wide and more than 50 mm. in length and further by including a hard textured coating to dissuade squirrels from feeding. The method of feeding woodpeckers by restricting access to the food source based on the bill size and tongue length of the woodpecker as opposed to the pest birds is also disclosed.

14 Claims, 2 Drawing Sheets

WOODPECKER FEEDER

BACKGROUND

This invention relates to a woodpecker feeder, one particularly adapted to feed woodpeckers while preventing access by other birds.

There are many woodpecker feeders on the market, including e.g., wire baskets, mesh bags and wood with holes drilled in them. These types of feeders are not selective in the bird species which use them and easily become dominated by pest birds such as Grackles, Starlings, and other pest birds.

Over the years there have been other designs that have attempted to overcome the problem of woodpecker feeders being dominated by pest birds. One type of woodpecker feeder that attempted to overcome this problem was a feeder with small holes in a plexiglas and wood casing with feed such as suet inside the casing. The problem with this type of feeder was that it took the birds a very long time to figure out how to use the feeder, most likely because the feed was so difficult to access. A large portion of the feed was not accessible, and therefore was not eaten by the birds and became moldy and rancid.

One object of the present invention is to provide a woodpecker feeder that is simple in design and economical to construct, yet which effectively prevents access to the feed by pest or undesirable birds or small animals. Another object of the invention is to provide such a construction that is easily accessible by the woodpecker and which further makes all of the feed in the feeder accessible to the woodpecker. A further object is to provide such a construction that is easily used and cleaned. These and further objects of the invention will be apparent from the following description of preferred embodiments thereof.

BRIEF SUMMARY OF THE INVENTION

The woodpecker feeder includes a first member, a second member, and a means for separating the inner surfaces of the two members. The distance between the inner surfaces (width) should be no less than 6 mm. and no greater than 12 mm, preferably 7-10 mm. The means for connecting the inner surfaces of the two members is incorporated so as to form an extended slot length between the two plates of at least 5 cm. The depth of the slot should be between 5 and 15 cm. from the external edge of the slot. The feeder may include means to dissuade small animals from chewing on the feeder by use of a hard textured coating material such as sand.

The method for feeding woodpeckers to the exclusion of undesirable species of birds is to construct the woodpecker feeder of the present invention and to place food suitable for woodpeckers within the feeder such that no part of the feed is inaccessible to a woodpecker having a combined bill and tongue length of 5-10 cm. The particular structure of this invention with the defined slot dimensions is particularly suitable for feeding woodpeckers since it enables woodpeckers to use the feeder (due to the physical characteristics of the woodpecker), while excluding most other indesirable species of bird.

BRIEF DESCRIPTION OF THE DRAWINGS

The invention is further described in connection with the accompanying drawings in which.

DETAILED DESCRIPTION OF THE INVENTION

Figure 1:
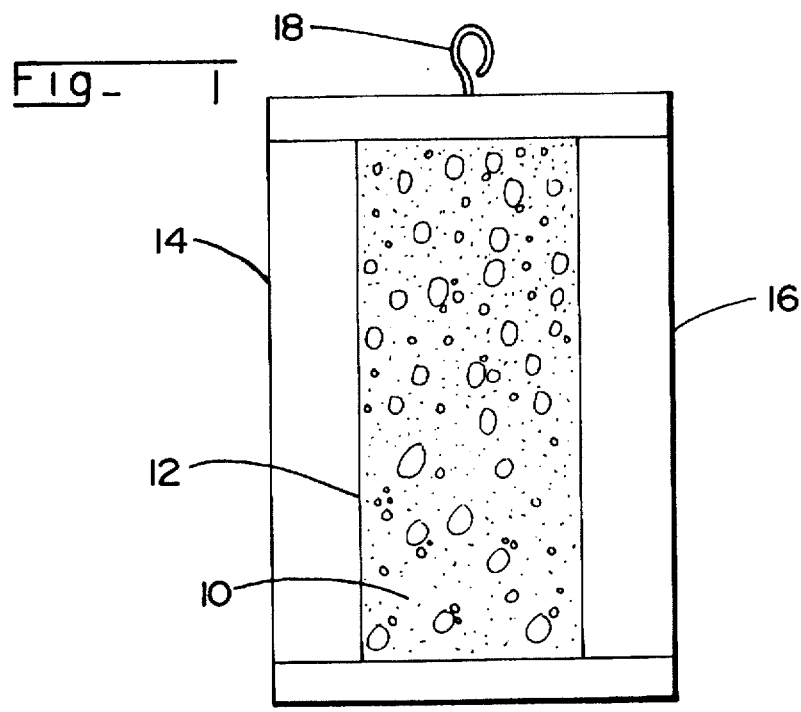
FIG. 1 is a front view of the woodpecker feeder constructed in accordance with the teaching of the present invention with the first member removed and showing the feeder with suet feed.

The woodpecker feeder of the present invention utilizes the very long tongue and bill length of the woodpeckers to selectively provide feed for them while excluding pest birds such as Grackles, Starlings and other blackbirds. The feeder as shown in FIG. 1 shows the suet feed 10 occupying the middle portion of the feeder. The distance between the edge 12 of the suet and the external edge 14 of the rear plate should be about 2 cm. The typical distance for the plate shown, from one external edge 14 to the other external edge 16, would be approximately 13 cm., which means that the depth of the feed would be approximately 9 cm. This prevents the more undesirable pest birds from having easy access to the portion of the feed closest to the external edge of the feeder. The suet 10 at any point should be no more than approximately 5-10 cm. from the external edge of the plate, since the woodpecker's bill and tongue should be able to extend approximately 5-10 cm. from the external edge to access the suet for approximately 5-10 cm. from the edge. It is desirable for the woodpecker to have access to all of the food in order to prevent inaccessibility of the food which could result in the food becoming moldy and rancid. The means for suspending the woodpecker feeder is a hook 18 as shown in FIG. 1.

Figure 2:
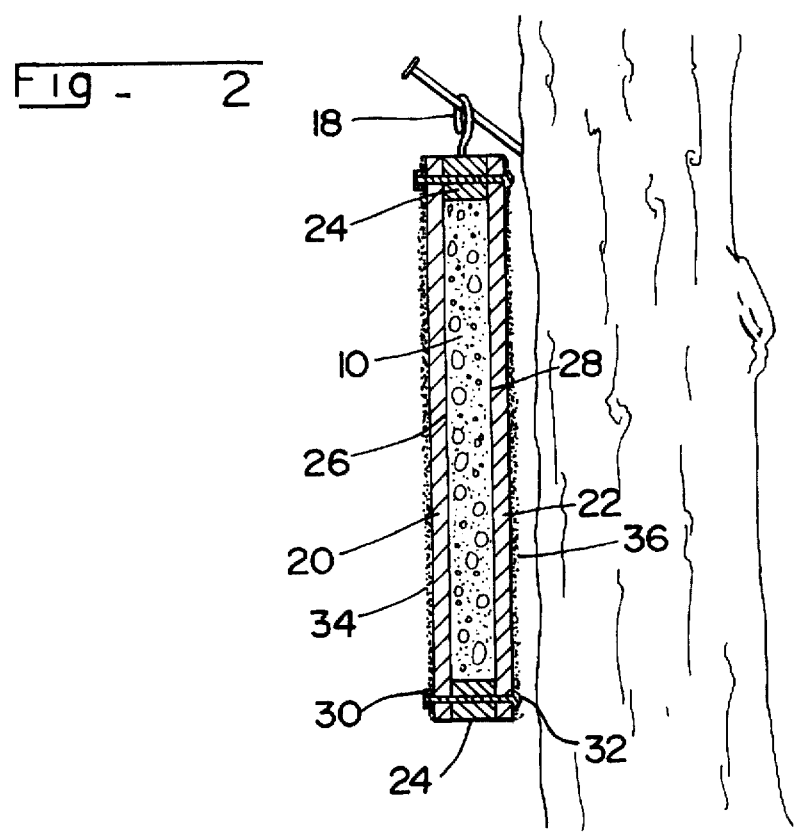
FIG. 2 is a side cross-sectional view of the feeder.

In FIG. 2 the woodpecker feeder is shown suspended from the hook 18 hanging from a nail embedded in a tree. The side cross-sectional view of the feeder shows the construction of the feeder. The first plate 20 is shown parallel to the second plate 22 separated by a spacer 24. The spacer 24 is inserted at the top and the bottom of the feeder between the inner surface 26 of the first plate and the inner surface 28 of the second plate. In order to maximize accessibility of the suet 10 to the woodpecker and to minimize the accessibility by pest birds such as Grackles, Starlings and other blackbirds, and based on the length of the woodpecker's bill and tongue, the distance between the inner surface 26 of the first plate and the inner surface 28 of the second plate should be no less than 6 mm. and no greater than 12 mm, preferably 7-10 mm.

The means for connecting the first plate and the second plate together is the knurled nut 30 and screw 32 which, as shown in FIG. 2, extends through the first plate 20, the spacer 24 and the second plate 22. In order to minimize the time a woodpecker would take to figure out how to use the woodpecker feeder, it is important to optimize the length of the extended slot between the two spacers 24 and bordered by the first plate 20 and the second plate 22. The optimal length for the extended slot 11 should be at least 5 cm.

In a suet woodpecker feeder of the present invention having the opening described above, birds and small animals such as squirrels would be able to remove suet from the feeder only up to a depth of about 19 mm. which is one of the reasons that the suet should be placed at least 19 mm. from the edge of the plates. However, the squirrels, when they can't reach the suet, will test chewing on the feeder and one way to dissuade squirrels from chewing on the feeder is to coat the external surface of the plates with a hard textured substance like sand. In FIG. 2 there are two layers of sand coating shown. The first layer of sand coating 34 is shown on the external surface of the first plate 29 and the second layer of sand coating 36 is shown coating the external surface of the second plate 22. The sand coating also provides a rough texture for birds to hang on to.

Figure 3:
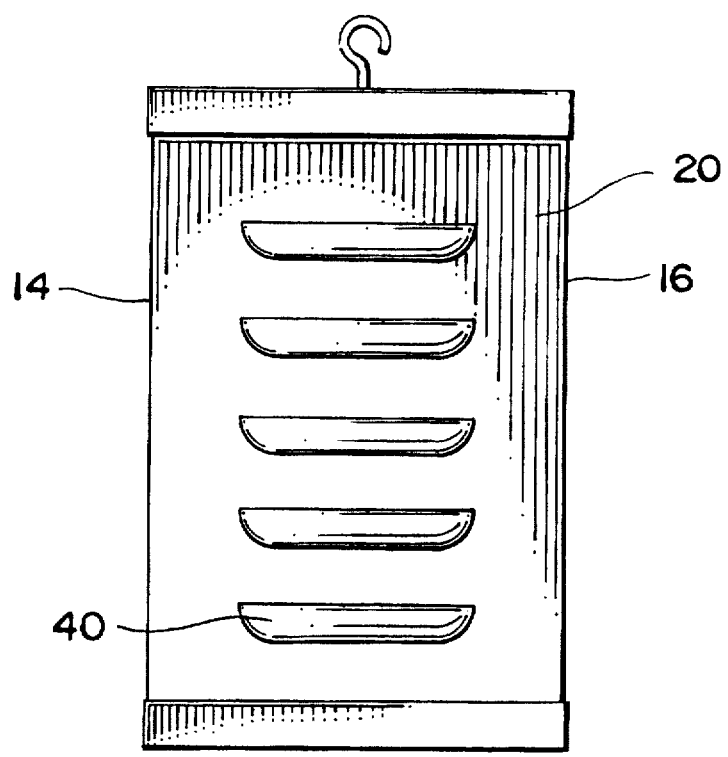
FIG. 3 is the same view as FIG. 1 only showing the feeder with cups and particulate feed.

FIG. 3 is the same view as FIG. 1 only with cups 40, suitable for holding particulate types of bird feed adhered to the rear plate 20. The cups are situated so that, like the suet shown in FIG. 1, the bird feed is at least 19 mm. from the external edges 14 and 16 of the plates. The bird feed suitable for woodpeckers that could be used with the embodiment of the present invention shown in FIG. 3 would be particulate types of woodpecker feed such as sunflower seeds, corn, nuts, mealworms, etc. The cups would typically have a width of 5–10 cm. and a depth of 1–3 cm.

I claim:

1. A woodpecker feeder including:
   (a) a first member having an inner surface and an external surface;
   (b) a second member, parallel to said first member, having an inner surface and an external surface;
   (c) means for separating the inner surface of said first member from the inner surface of said second member wherein the distance between the inner surface of said first member and the inner surface of said second member is 6–12 mm.;
   (d) means for connecting the inner surface of said first member and the inner surface of said second member so as to form an extended slot between said first member and said second member, said slot having a length of at least 5 cm.

2. The woodpecker feeder as set forth in claim 1 further comprising means for suspending said feeder connected to said woodpecker feeder.

3. The woodpecker feeder as set forth in Claim 1, further comprising the external surfaces of said first and second members having a coating of a hard textured material.

4. The woodpecker feeder as set forth in claim 1 wherein said slot has a depth of at least 8 cm.

5. The woodpecker feeder as set forth in claim 1 wherein the distance between the inner surfaces of said first and second members is 7–10 mm.

6. The woodpecker feeder as set forth in claim 1 further comprising means for holding bird feed attached to the inner surface of said first member within said woodpecker feeder.

7. The woodpecker feeder as set forth in claim 1, further comprising at least one cupped member fastened to the inner surface of said first member and suitable for holding non-sticking bird feed.

8. A woodpecker feeder suitable for holding bird feed including a body having a slot, accessible on at least one end of the slot on the exterior of the feeder, said slot having the following dimensions:
   (a) width of 6–12 mm.
   (b) length of greater than 5 cm.
   (c) depth of at least 5 cm. and less than 15 cm.

9. The woodpecker feeder as set forth in claim 8 wherein said slot is accessible at both ends of the slot and the depth is at least 8 cm.

10. The woodpecker feeder as set forth in claim 8 wherein said slot is accessible at only one end of the slot and the depth is less than 8 cm.

11. The woodpecker feeder as set forth in claim 8 wherein said slot has a width of 7–10 mm.

12. A method for feeding woodpeckers comprising placing feed suitable for woodpeckers in a woodpecker feeder such that substantially no part of said woodpecker feeder is inaccessible to a woodpecker having a combination bill and tongue length of 5–10 cm, said feeder comprising: an exterior body having a slot, accessible at at least one end of the slot on the exterior of the feeder and suitable for a woodpecker to fit its bill within, said slot having the following dimensions: (i) width of 6–12 mm; (ii) length of greater than 5 cm; and (iii) depth of at least 5–15 cm.

13. A method of feeding woodpeckers set forth in claim No. 12 wherein said food suitable for woodpeckers is placed more than 19 mm. within said slot of said woodpecker feeder.

14. A method for feeding woodpeckers set forth in claim No. 12 wherein the body of the feeder has an external surface including a hard textured material.

* * * * *